United States Patent
Gralnick et al.

(10) Patent No.: US 10,599,612 B1
(45) Date of Patent: Mar. 24, 2020

(54) METHOD AND SYSTEM FOR FEDERATED CONTEXT COLLABORATION SERVICE

(71) Applicant: JPMorgan Chase Bank, N.A., New York, NY (US)

(72) Inventors: Samuel L. Gralnick, Cold Spring, NY (US); Vincent Feingold, Haledon, NJ (US); Peter Kinsman, Larchmont, NY (US); Brian Fay, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 898 days.

(21) Appl. No.: 15/008,845

(22) Filed: Jan. 28, 2016

(51) Int. Cl.
*G06F 16/00* (2019.01)
*G06F 7/00* (2006.01)
*G06F 16/13* (2019.01)
*G06F 16/25* (2019.01)

(52) U.S. Cl.
CPC .............. *G06F 16/13* (2019.01); *G06F 16/25* (2019.01)

(58) Field of Classification Search
CPC ......... G06F 17/30607; G06F 17/30595; G06F 17/30286; G06Q 10/06; G06Q 10/10
USPC ........................................................ 707/792
See application file for complete search history.

(56) References Cited

U.S. PATENT DOCUMENTS

| | | | |
|---|---|---|---|
| 2003/0093479 A1* | 5/2003 | Mellen-Garnett | G06F 9/54 709/205 |
| 2007/0038603 A1* | 2/2007 | Guha | G06F 16/9535 |
| 2014/0222752 A1* | 8/2014 | Isman | G06F 11/3684 707/603 |
| 2015/0066896 A1* | 3/2015 | Davis | G06F 16/9038 707/710 |
| 2017/0017708 A1* | 1/2017 | Fuchs | G06F 16/288 |

\* cited by examiner

*Primary Examiner* — Usmaan Saeed
*Assistant Examiner* — Raquel Perez-Arroyo
(74) *Attorney, Agent, or Firm* — Hunton Andrews Kurth LLP (57) ABSTRACT

According to an embodiment of the present invention, a federated context collaboration architecture comprises: a context store that stores contexts consumed and produced by participants, where a context represents a description of a dataset that provides a consistent flexible and technology independent mechanism for referencing data; each context comprises a context key; a context state and a context class; a context producer interface programmed to: define and reference datasets, data exchange, and data dependencies associated with each context; a context engine coupled to the context database and the context producer interface to communicate at least the state of data, data lineage and dependencies of data used to integrate and coordinate processes across different domains and infrastructures; a method for optimized selective priming of testing environments based on datasets necessary and sufficient for designated test suite; and a communication interface that communicates a defined metadata profile of each context.

17 Claims, 10 Drawing Sheets

METHOD AND SYSTEM FOR FEDERATED CONTEXT COLLABORATION SERVICE

FIELD OF THE INVENTION

The present invention relates generally to federated context collaboration and more specifically to a context based control framework that defines and manages data sets in a distributed environment.

BACKGROUND OF THE INVENTION

In general, context may be referred to as a mechanism for referencing data in datasets. The term "dataset' as used herein refers to any ordered or unordered collection of data that includes one or more records, files, objects, documents, images, or any other persisted copy of structured or unstructured data. The basic constructs of context as a mechanism for identifying and controlling data at large scale has been developed for some time. However, current approaches of managing context fail to capture a comprehensive understanding of the context and thereby result in reliance on incomplete data. Moreover, traditional approaches lack visibility to details of the underlying data.

Other drawbacks may also be present.

SUMMARY OF THE INVENTION

Accordingly, one aspect of the invention is to address one or more of the drawbacks set forth above. According to an embodiment of the present invention, a federated context collaboration architecture provides a consistent flexible and technology independent mechanism for referencing data, managing state of data, implementing compensating transaction functionality independent of underlying participants' transaction mechanism and not requiring a transaction coordinator, and providing design- and run-time data provenance and lineage; the federated context collaboration architecture comprising: a context store that stores contexts consumed and produced by participants, where a context represents a description of a dataset; each context comprises a context key; a context state, a context class, data tags, methods of data-de-referencing, and data control metrics; and captured context dependencies; a context producer interface programmed to: define and reference data sets, data exchange, and data dependencies associated with each context; a context engine coupled to the context store and the context provider interface to communicate at least the state of data, data lineage and dependencies of data used to integrate and coordinate processes across different domains and infrastructures; and a communication interface that communicates a defined metadata profile of each context, the interface coupled to a communication network.

According to another embodiment of the present invention, an automated computer implemented method for implementing a federated context collaboration architecture comprises the steps of: storing, in a context database, contexts consumed and produced by participants, where a context represents a description of a dataset that provides a consistent flexible and technology independent mechanism for referencing or managing data; each context comprises a context key; a context state and a context class; defining, via a context producer interface, datasets, data exchange, and data dependencies associated with each context; processing and communicating, via a context engine coupled to the context database and the context producer interface, at least the state of data, data lineage and dependencies of data used to integrate and coordinate processes across different domains and infrastructures; and transmitting, via a communication interface a defined metadata profile of each context, the interface coupled to a communication network.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a context based control framework that defines and manages data sets in a distributed environment. The system may include a data interchange protocol that facilitates data management policies including context logical data model and state machine, and state machine for data referenced by the context. The system of an embodiment of the present invention publishes contexts for data sets while retaining internal implementations; defines sets of data objects within a collection; and further collects, persists and makes available a defined metadata profile of each published context.

A global framework of an embodiment of the present invention provides a mechanism for understanding the context and further provides visibility to the lineage and provenance of the underlying data.

An embodiment of the present invention is directed to developing uniform, technology stack independent architecture to define and manage data sets in heterogeneous distributed environments. The system of an embodiment of the present invention may further provide functionality directed to defining and referencing data sets; describing data exchange between systems and components; describing data dependencies; ensuring data protection; satisfying requirements for process repeatability; creating immutable data snapshots without excessive data duplication; tracking data lineage at design and run times at appropriate level of granularity; and ensuring process repeatability.

An embodiment of the present invention is directed to a context based control framework that rationalizes and integrates different implementations of the context services; and further extends context to cover additional types of data and media.

According to an embodiment of the present invention, context may provide a consistent flexible and technology independent mechanism of referencing data in various environments. For example, context de-referencing may provide a standard mechanism of accessing the underlying data. Combining contexts into composites provides a convenient standard structured mechanism of creating arbitrarily complex virtual data sets and streams. Further, context may provide a universal mechanism of data interchange between components and applications accessing data by reference or materializing data de-referenced from context. Moreover, context may be incorporated into a system design from the outset or super-imposed onto existing data for applications that do not use contexts. According to an embodiment of the present invention, context provides the ability to rerun processes as-was and as-if.

The context of an embodiment of the present invention provides a uniform, technology independent way of managing the data in the environment. Context status defines the state of the underlying data. For example, if a data is determined to be wrong, its context status may be changed to invalid (or other similar status) and the results produced based on this data may become invalid as well, so the business process may be repeated without any additional actions. Use of context in this manner allows implementation of a standard compensating transaction across multiple components without necessity of having transaction coordinator(s). According to another example, if data is determined to be stale, its context status may be changed to superseded (or other status) so the underlying data remains valid but invisible to newly run business processes. According to an exemplary embodiment, context may describe data location, date of creation, and retention period in active area and online archive, as well as other features and/or information. Also, various tasks may use context information. For example, archiving tasks may use this information to move data with an expired retention period into an archive, a recycle bin or other location.

According to an embodiment of the present invention, context may provide a uniform mechanism for high grain data traceability by capturing and recording the contexts of the data inputs and business activities used in production of a data set at run-time. The complete provenance and lineage (e.g., what data was used and what processes were run) of the data set may be recalled and displayed by traversing the resulting directed acyclic context graph.

Context provides a mechanism of controlling access to the data via an ACL (Access Control List) associated with the context. An ACL contains list of ACE (access control entrees) where each ACE contains users name or role and list of actions allowed to the user or role on the dataset. In this example, context may provide a uniform mechanism for instantiating sandboxes and running them alongside the production data. Contexts may have namespaces, and mixing contexts with default and user specific namespaces allows creation of the data visible to the user with respective namespace. Sandboxes created in this manner may contain real production data, hypothetical account/trade data as well as dimensions.

The same mechanism may be used to process in production parallel new, pre-production data in production environments. For example, context may support processing of multiple periods in the same environment. It also allows quick preparations of a testing environment, by copying down contexts that participated in a particular instance of a business process chosen as a test bed. Accordingly, context may be used to demarcate a boundary of external transaction and provide save points during multi-step processing involving components implemented in possibly different technologies.

An embodiment of the present invention is directed to providing a Federated Context Collaboration Service for data producers, consumers and other users to communicate the state of the data that they land and produce, and the dependencies of these on data that is used, thus facilitating integration and coordination of processes across the enterprise in different domains and across various infrastructures. An embodiment of the present invention implements agreed naming and state definition conventions and communication protocols. Systems participating in the collaboration may do so in various roles, including data producer, data consumer, etc. In addition, a repository service may provide registration services and an archive of contexts consumed and produced by participants.

A Federated Context Collaboration Service of an embodiment of the present invention allows participating systems to publish contexts for the data sets that they produce while retaining their own internal implementation for process and data management. An embodiment of the present invention may further define a need for a set of data objects that are a subset of a larger set of objects, or, a set of data objects or events that are a collection of such sets; and further collect, persist and make available a defined metadata profile of each published context.

In addition, a Federated Context Collaboration Service of an embodiment of the present invention may allow consumers to specify composite contexts that meet specific data needs (e.g., latest derivative trade data as of 2200 NY, etc.) and rules for handling service level agreement (SLA) breach events; communicate the state of contexts (e.g., valid, invalid, suspended, superseded, etc.) as a message from a creator of the context to participants in the collaboration as well as other recipients. An embodiment of the present invention further provides a registry of contexts governed by an agreed model and interaction protocols; captures an auditable history of context use and production—represented by messages—that may provide design- and run-time provenance and data lineage; and reduces the number of required reconciliations by providing effective synchronization and traceability of data consumption.

An embodiment of the present invention may be implemented in various context services. Exemplary implementations may include Process Control; Data Consistency and Tracking "Provenance" at a Data Federated Context set level.

Process Control may involve attendance tracking; management of data within the business process—the state of one or more contexts (at any level) may trigger downstream processes; processing same task for multiple periods simultaneously; processing daily and monthly tasks simultaneously; and processing production and production-parallel data sets.

Data Consistency may include immutability of data through a reliable, repeatable execution of the context query, or a segregated copy of the data; centralized management of views of data ensure consumers see the same snapshot; reuse of contexts in multiple composite contexts to allow multiple views of the same data; and alignment of Reference Data to snapshot.

Tracking "provenance" at a data set level may include support such that data sets may be traced though a system flow at runtime, as well as identify semantics of the data set (e.g., when it was created, what sources it uses, how it was constructed, etc.).

The individual implementations may be independent and may be performed on different technology stacks.

Figure 1:
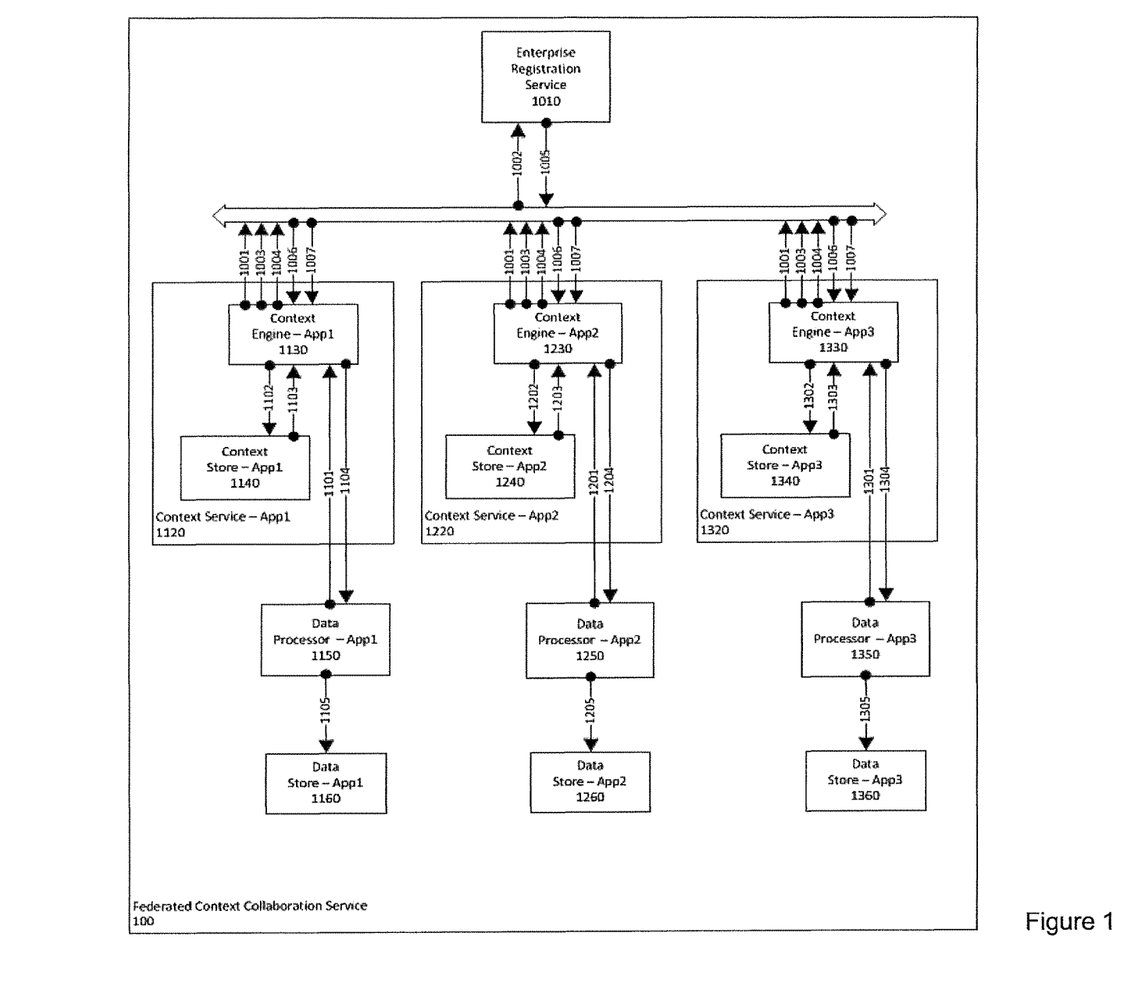
FIG. 1 is an exemplary illustration of a registration service and set of context services, according to an embodiment of the present invention.

FIG. 1 is an exemplary illustration of a registration service, according to an embodiment of the present invention. System 100 illustrates an exemplary implementation of a system of an embodiment of the present invention. Common Registration Service (1010) communicates with various Contest Services, as shown by App 1 (1120); App 2 (1220) and App 3 (1320). Each Context Service may further include a Context Engine (1130, 1230, 1320 implemented on Big Data, API based, and SQL based technology stacks respectively, but not limited to the enumerated technologies) and Context Store (1140, 1240, 1340) associated with the respective Context Engines (1130, 1230, 1320), where each Context Service may be in further communication with various aligned Data Processors (1150, 1250, 1350) and their respective Data Stores (1160, 1260, 1360). For example, Context Service—App 1 (1120) may include Context Engine 1130 and Context Store 1140, and further communicate with Data Processor 1150 and its respective Data Stores 1160. Context Service—App 2 (1220) may include Context Engine 1230 and Context Store 1240, and further communicate with Data Processor 1250 and its respective Data Stores 1260. Context Service—App 3 (1320) may include Context Engine 1330 and Context Store 1340, and further communicate with Data Processor 1350 and its respective Data Stores 1360. Each Context Service may represent a component of a system that provides information about data managed by this particular system. It may describe the data as well as the location of the data, contents, specific representation, such as schema and methods of access to the data. Moreover, the system of an embodiment of the present invention may interchange data without having to physically copy the data and store it in its own repository.

As shown in FIG. 1, a common resilient Enterprise Registration Service may accept and serve registrations for application aligned context servers to advertise and subscribe to contexts they are interested in. For example, the Context Service may send registration for produced contexts, as shown by 1001; accept and save registration, as shown by 1002; publish context, as shown by 1003; request information about required registrations, as shown by 1004; provide information about existing registrations, as shown by 1005; receive information about requested registrations, as shown by 1006; and receive published contexts, as shown by 1007.

Data Processor may request context creation as shown by 1101, 1201, and 1301; Context Engine may request a context status change, as shown by 1102, 1202, and 1302; Context Engine receive the confirmation of status changes, as shown by 1103. 1203, and 1303; Context Engine may communicate context identification and status to Data Processor as shown by 1104, 1204, and 1304; Data Processor may create data set as shown by 1105, 1205, and 1305.

A system may register an interest in data generated by other systems as well as the characteristics of data that component or system produces. By sharing this data as a data descriptor, an embodiment of the present invention may provide an exchange of data between system components.

Other applications may include application aligned registration services that accept and serve registrations for application aligned context servers to advertise and subscribe to contexts they are interested in. Each registration service may hold all registrations. According to an exemplary illustration example, the Common Registration Service may send registration for produced contexts; accept and save registration; publish context; request information about required registrations; provide information about existing registrations; receive information about requested registrations; and receive published contexts. This exemplary configuration is illustrated in FIG. 2.

Figure 2:
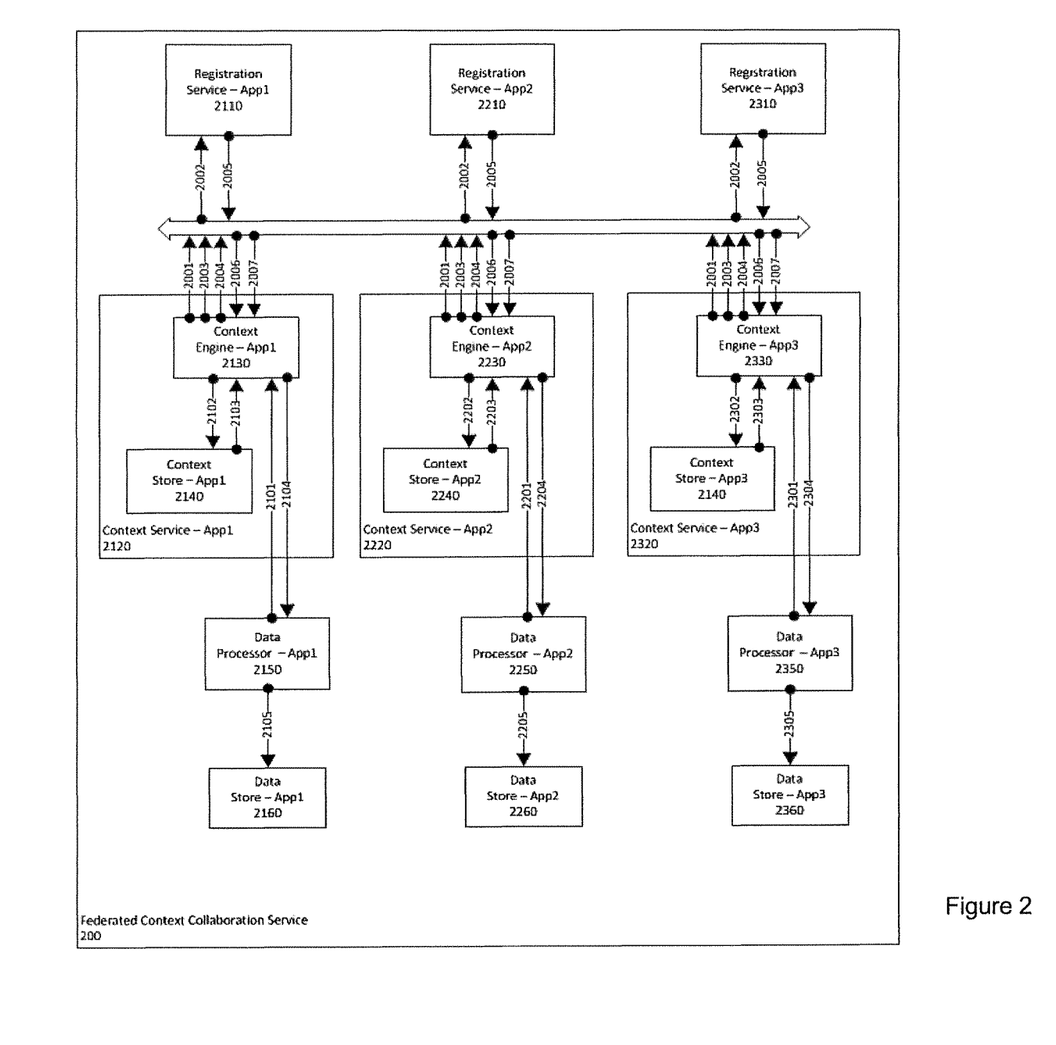
FIG. 2 is an exemplary illustration of a registration service and set of context services, according to an embodiment of the present invention.

FIG. 2 is an exemplary illustration of a registration service and set of context services, according to an embodiment of the present invention. System 200 illustrates an exemplary implementation of a system of an embodiment of the present invention. In this example, Application aligned Registration Services (2110, 2210, 2310) communicates with various Contest Services, as shown by App 1 (2120); App 2 (2220) and App 3 (2320). Each Context Service may further include a Context Engine (2130, 2230, 2320 implemented on Big Data, API based, and SQL based technology stacks respectively, but not limited to the enumerated technologies) and Context Store (2140, 2240, 2340) associated with the respective Context Engines (2130, 2230, 2320), where each Context Service may be in further communication with various aligned Data Processors (2150, 2250, 2350) and their respective Data Stores (2160, 2260, 2360). For example, Context Service—App 1 (2120) may include Context Engine 2130 and Context Store 2140, and further communicate with Data Processor 2150 and its respective Data Stores 2160. Context Service—App 2 (2220) may include Context Engine 2230 and Context Store 2240, and further communicate with Data Processor 2250 and its respective Data Stores 2260. Context Service—App 3 (2320) may include Context Engine 2330 and Context Store 2340, and further communicate with Data Processor 2350 and its respective Data Stores 2360. Each Context Service may represent a component of a system that provides information about data managed by this particular system. It may describe the data as well as the location of the data, contents, specific representation, such as schema and methods of access to the data. Moreover, the system of an embodiment of the present invention may interchange data without having to physically copy the data and store it in its own repository.

As shown in FIG. 2, application aligned Enterprise Registration Services (2110, 2210, 2310) may accept and serve registrations for application aligned context servers to advertise and subscribe to contexts they are interested in. For example, the Context Service may send registration for produced contexts, as shown by 2001; accept and save registration, as shown by 2002; publish context, as shown by 2003; request information about required registrations, as shown by 1004; provide information about existing registrations, as shown by 2005; receive information about requested registrations, as shown by 2006; and receive published contexts, as shown by 2007.

Data Processor may request context creation as shown by 2101, 2201, and 2301; Context Engine may request a context status change as shown by 2102, 2202, and 2302; Context Engine receive the confirmation of status changes as shown by 2103, 2203, and 2303; Context Engine may communicate context identification and status to Data Processor as shown by 2104, 2204, and 2304; Data Processor may create data set as shown by 2105, 2205, and 2305.

Figure 3:
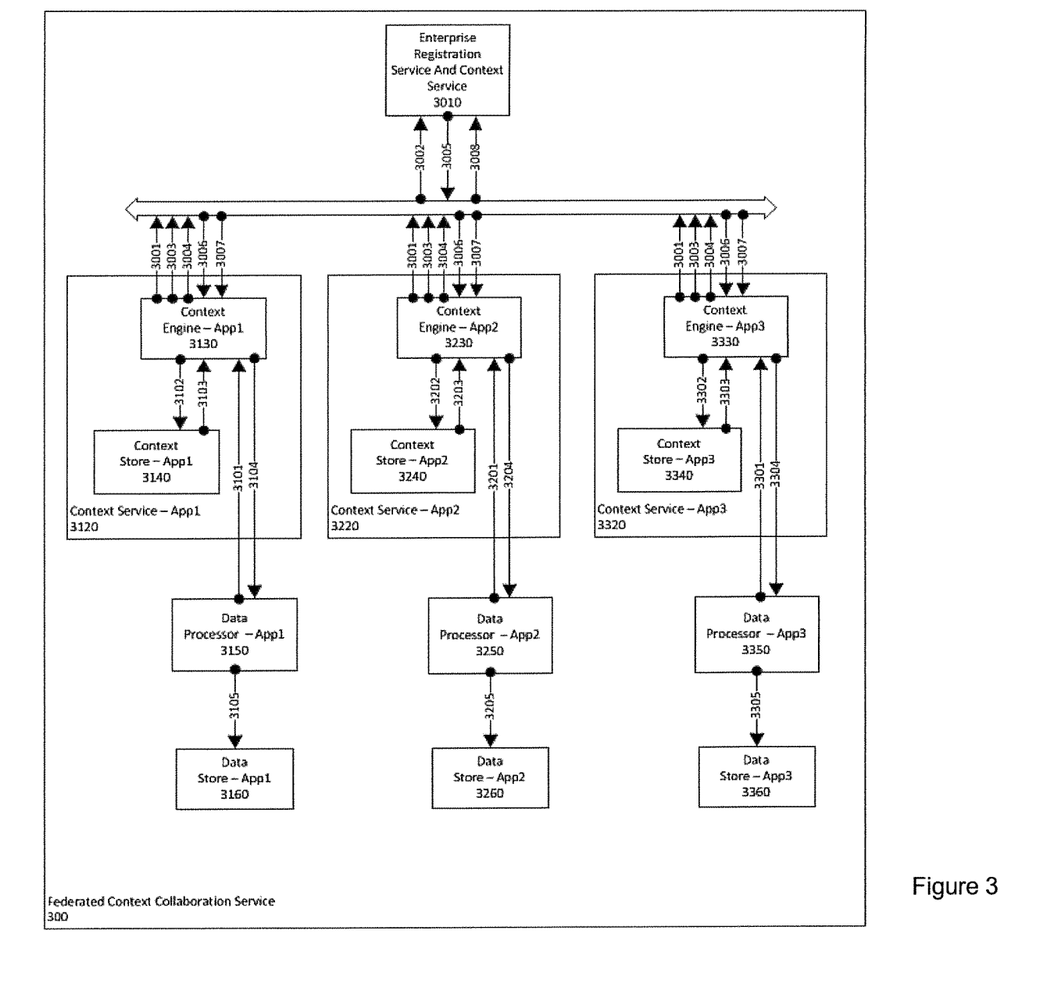
FIG. 3 is an exemplary illustration of a registration service and set of context services, according to an embodiment of the present invention.

According to yet another example shown on FIG. 3, a common resilient context service may accept and serve registrations for application aligned context servers to advertise and subscribe to contexts they are interested in. The service may collect produced contexts and serve as a single point of context discovery. According to an exemplary illustration example, the Common Registration Service may send registration for produced contexts; accept and save registration; publish context; request information about required registrations; provide information about existing registrations; receive information about requested registrations; and receive published contexts.

FIG. 3 is an exemplary illustration of a registration service, according to an embodiment of the present invention. System 300 illustrates an exemplary implementation of a system of an embodiment of the present invention. Enterprise Registration and Context Service (3010) communicates with various Contest Services, as shown by App 1 (3120); App 2 (3220) and App 3 (3320). Each Context Service may further include a Context Engine (3130, 3230, 3320 implemented on Big Data, API based, and SQL based technology stacks respectively, but not limited to the enumerated technologies) and Context Store (3140, 3240, 3340) associated with the respective Context Engines (3130, 3230, 3320), where each Context Service may be in further communication with various aligned Data Processors (3150, 3250, 3350) and their respective Data Stores (3160, 3260, 3360). For example, Context Service—App 1 (3120) may include Context Engine 3130 and Context Store 3140, and further communicate with Data Processor 3150 and its respective Data Stores 3160. Context Service—App 2 (3220) may include Context Engine 3230 and Context Store 3240, and further communicate with Data Processor 3250 and its respective Data Stores 3260. Context Service—App 3 (3320) may include Context Engine 3330 and Context Store 3340, and further communicate with Data Processor 3350 and its respective Data Stores 3360. Each Context Service may represent a component of a system that provides information about data managed by this particular system. It may describe the data as well as the location of the data, contents, specific representation, such as schema and methods of access to the data. Moreover, the system of an embodiment of the present invention may interchange data without having to physically copy the data and store it in its own repository.

As shown in FIG. 3, a common resilient Enterprise Registration Service may accept and serve registrations for application aligned context servers to advertise and subscribe to contexts they are interested in; it also may receive and store published contexts. For example, the Context Service may send registration for produced contexts, as shown by 3001; Enterprise Registration Service may accept and save registration, as shown by 3002 and accept information about published contexts as shown by 3008; Context Service may publish context, as shown by 3003; request information about required registrations, as shown by 3004; provide information about existing registrations, as shown by 3005; receive information about requested registrations, as shown by 3006; and receive published contexts, as shown by 3007.

Data Processor may request context creation as shown by 3101, 3201, and 3301; Context Engine may request a context status change as shown by 3102, 3202, and 3302; Context Engine receive the confirmation of status changes as shown by 3103, 3203, and 3303; Context Engine may communicate context identification and status to Data Processor as shown by 3104, 3204, and 3304; Data Processor may create data set as shown by 3105, 3205, and 3305.

According to an embodiment of the present invention, a Context may represent a description of a data set in a system component or an application. The context may record metadata about an immutable data set. Context records may describe what the data is, where it is, its state, who produced it, what other contexts were used to produce the data thus enabling data provenance, discreet data access, identification of data lifespan, and implementation of an archival strategy.

For example, when a platform loads the data from an external producer, it creates a context. In addition, when a process creates data, the data may be identified by a context, a record of the contexts may be used to produce that data and its dependencies may be created. As a convenience, contexts may be called composites that are references to a group of contexts so that they need not be referenced one by one.

Figure 4:
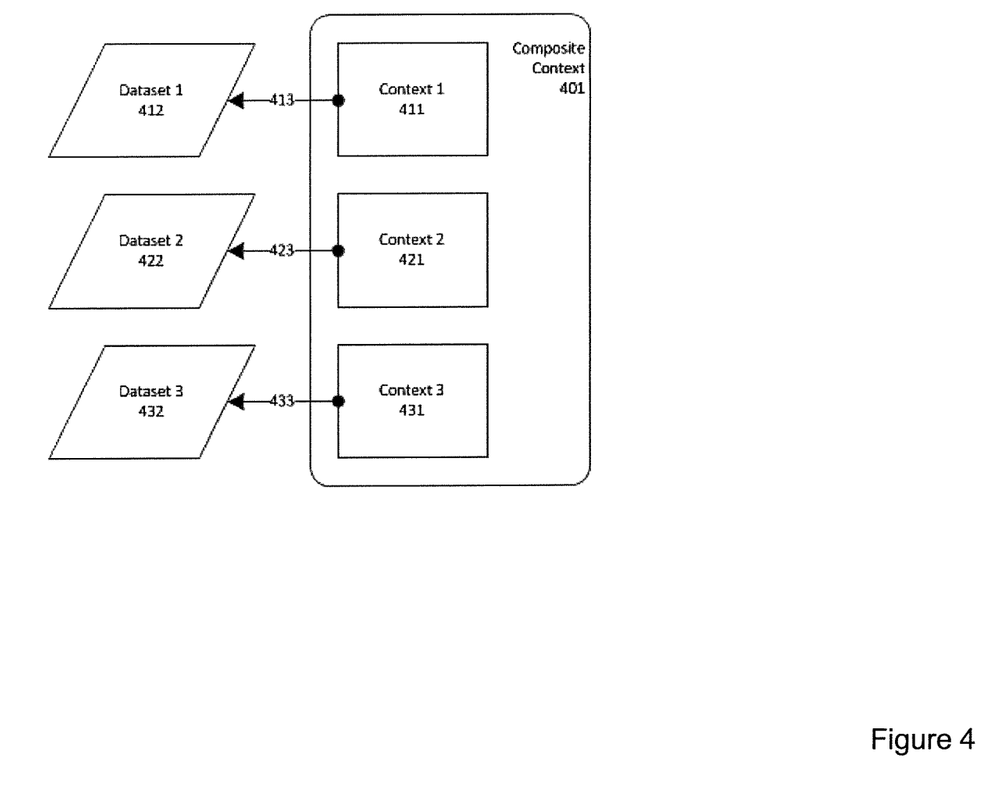
FIG. 4 is an exemplary illustration of composite context and virtual data set, according to an embodiment of the present invention.

FIG. 4 is an exemplary illustration of composite context and virtual data set, according to an embodiment of the present invention. FIG. 4 shows how composite context 401 may include individual contexts 411, 421, and 431. Each of the individual contexts may point to its respective dataset: context 411 points to dataset 412 by 413, context 421 points to dataset 422 by 423, and context 431 points to dataset 432 by 433. By consolidating these references context 401 points to virtual dataset comprised of material datasets 412, 422, and 432.

According to an embodiment of the present invention, Context Keys may represent identifiers of the data objects that make up the data set. This facilitates storage of metadata separately from the objects and provides the basis for collaboration across multiple systems having their own local implementations of context and business process management. The keys may be numeric keys, strings, or date-time stamps, etc.; the only requirement for a key is uniqueness.

According to an embodiment of the present invention, a Context State describes the state of the referenced data set. For example, Context State may include started, completed, invalidated, retired, amended, adjusted, superseded and archived. Other states may be identified and applied. According to an embodiment of the present invention, a Context Event may represent any event that changes the state of a context.

According to an embodiment of the present invention, Context Classes may vary from simple, composite, filtered/recipe, and adjusted. For example, a Simple class may reference a set of data objects directly. A Composite class may reference a set of contexts, but not data objects directly. A Filtered/Recipe class may reference a subset of data objects belonging to a larger set in accordance with defined filtering criteria. An Adjusted class may reference base data set and a set of adjustments applied to the base data set. Other variations and classes may be implemented.

An embodiment of the present invention may support various Context Types, such as key based, data-time, manifest, window, recipe context and others. For Key Based, every data object in the referenced data set may contain the context's key. This may be considered ideal for data loaded in one transaction during batch load. Date-Time may contain a timestamp and may further include data objects from the referenced data stream whose effective date may be less than the context's timestamp and expiration date may be more than the context's timestamp. This may be considered ideal for slowly changing dimensions. Timestamp may represent uni-temporal and bi-temporal view of the temporal dimension. A Manifest may include identifiers of specific data objects in the referenced data stream. This may be considered ideal for creating a non-contiguous snapshot out of an event stream. A Window may define start and end time and may further include latest versions of events/messages from the referenced data streams arrived between context's start and end times. This may be considered ideal for creating a contiguous snapshot out of an event stream. A Recipe Context may contain search expression to extract certain elements from the overall data set.

Figure 5:
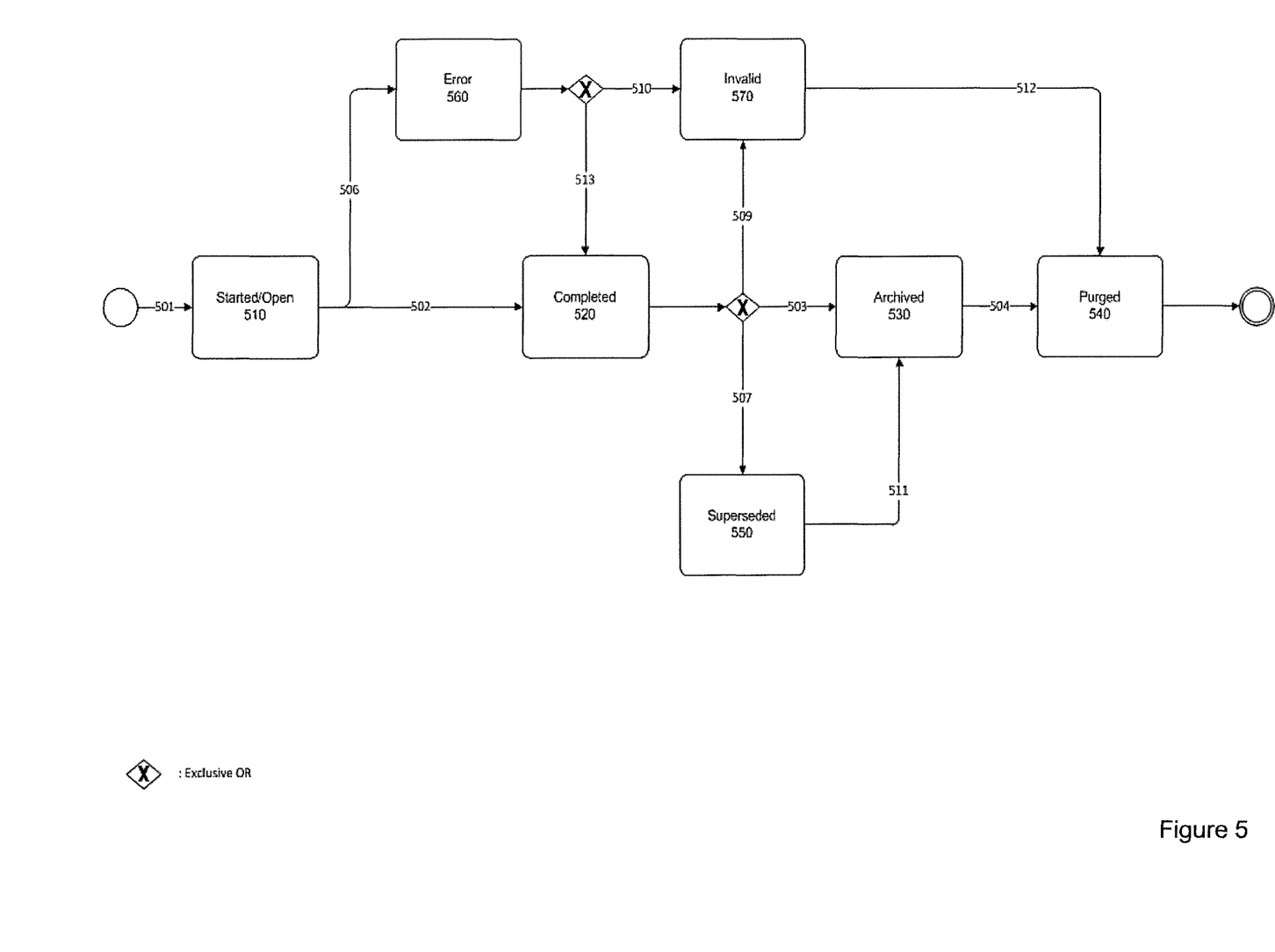
FIG. 5 is an exemplary illustration of a context state transition, according to an embodiment of the present invention.

FIG. 5 illustrates an exemplary context state transition, according to an embodiment of the present invention. Other context states and variations may be implemented in accordance with the embodiments of the present invention. For example, during a context lifecycle, a context may be created in a Started/Open state 510 via transition 501, at which time only the application that created it can see it and modify its content. From there, context may go to a completed state 520 via transition 502 if creation and population operation finished successfully, into the error state 560 via transition 506 if the operation finished unsuccessfully, from where it may go into the invalid state 570 via transition 510 if operation was manually halted. From this point on, the content of the context is immutable. Context may be superseded 550 via transition 507 when newer data of the same type is available but the content of the context is still acceptable and some results were produced based on the content. The context may be manually invalidated if its content is deemed wrong moving into state 570 via transition 509. As shown by 513, the context state may move from the error state to the completed state after manual or systemic repairs to the underlying data.

When context moves into invalid state 570 all results that depend on it, directly or indirectly, become invalid and cannot be used any longer.

After a predefined but manually adjustable time, the content of the context may be moved into an archive area, where context moves to the archived state 530 via transitions 503 and 511 depending on the current state. When the content of the context exceeds a retention period, it may be purged and the context moves to the purged state 540 via transitions 504 or 512. Accordingly, invalid, error, or purged contexts may be removed from the system. FIG. 5 illustrates an exemplary embodiment, other contexts, stages and variations may be implemented based on various applications and/or other factors.

According to an embodiment of the present invention, invalid state may be propagated to contexts that use the context as an input, as stated above. This may be done recursively.

Figure 6:
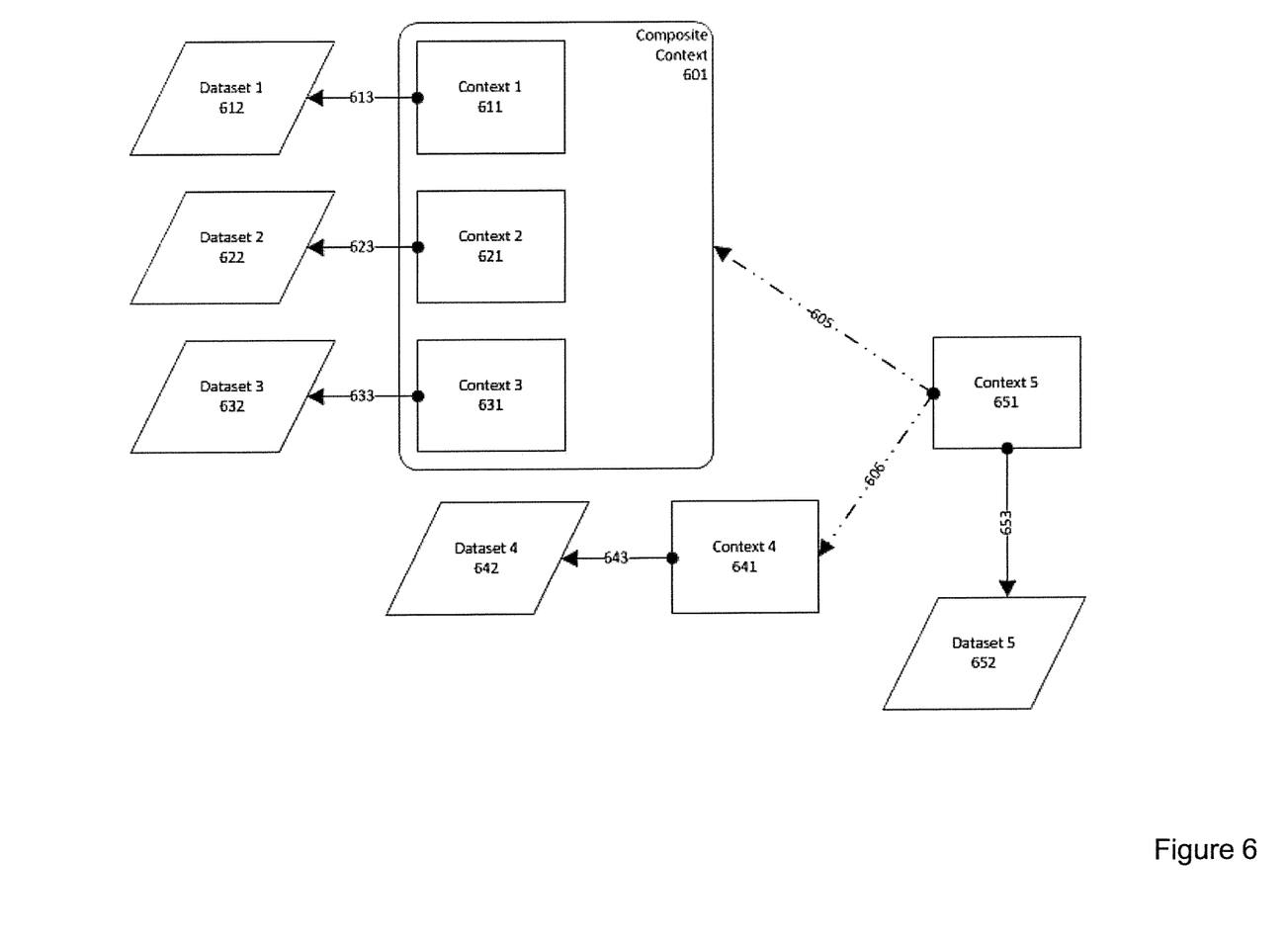
FIG. 6 is an exemplary illustration of the data and context directed acyclic dependency graph including path of a compensating transaction, according to an embodiment of the present invention.

FIG. 6 is an exemplary illustration of the data and context directed acyclic dependency graph including path of a compensating transaction, according to an embodiment of the present invention. For example, on FIG. 6, if Context 2 (621) is invalidated then its state is propagated to Composite Context 601 via inclusion and to Contexts 5 (651) via dependency 605. Dataset 2 (622), virtual dataset comprised of datasets 1, 2, and 3 (612, 622, 632), and dataset 5 (652) become invisible. Individual dataset 1 (612) and 3 (632) remain visible; dataset 4 (642) is unaffected by the transition.

An embodiment of the present invention is directed to Context Dependencies. Composite context may serve as a collection of other contexts to define portfolios of data sets that are acted upon as a unit of processing. An example is a portfolio of deposits constructed out of feeds from domestic and international processing platforms, and overdrafts platform as collection of hundreds of feeds. Context may keep track of its input contexts that describe input data that was used in producing content of the context. FIG. 6 provides an example of such dependency. Context 5 (651), the context related to a derived/calculated dataset which requires datasets 1 (612), 2 (622), 3 (633) and 4 (642) to be complete and available as inputs and, therefore, depends on Context 4 (641) via input dependency 606 and on Composite Context (601) via dependency 605. Composite Context 601 includes Context 1 (611), Context 2 (621), and Context 3 (631). Applied recursively this feature may provide run time provenance of data at a set level and allow tracking of data sets used in the production of a particular result set or a report. For the example depicted on FIG. 6, data in Dataset 5 (652) depends on data in Dataset 4 (642), Dataset 1 (612), Dataset 2 (622), and Dataset 3 (632); this fact can be inferred from dependencies 653, 605, 613, 623, 633, 606, 643 and the fact that Context 601 includes Contexts 611, 621, and 631.

According to an embodiment of the present invention, context may be implemented based on a federated peer to peer collaboration of data providers and data consumers. In this exemplary model, providers publish context instance messages and consumers subscribe to messages of interest. A central repository service may be a peer to producers and subscribers, providing a restricted set of registry services.

Figure 7:
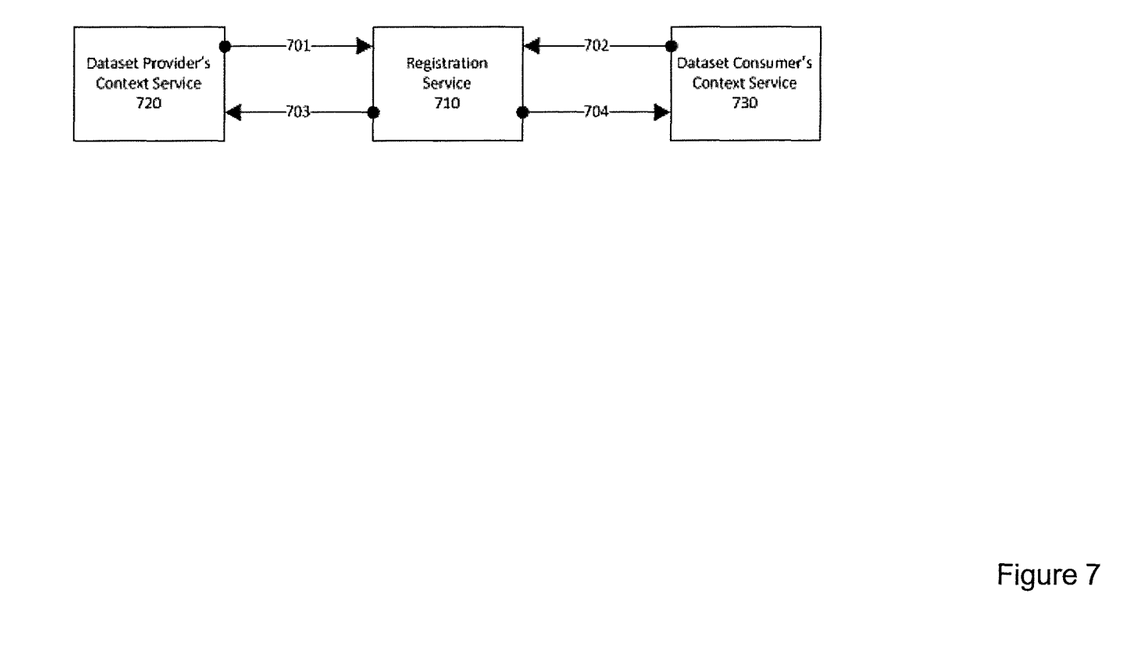
FIG. 7 is an exemplary illustration of federated context collaboration model architecture at a design time, according to an embodiment of the present invention.

FIG. 7 is an exemplary illustration of federated context collaboration model architecture at a design time, according to an embodiment of the present invention. More specifically, FIG. 7 is an exemplary protocol for implementing design time federated context collaboration model architecture, according to an embodiment of the present invention. The exemplary protocol ensures bidirectional traceability of the data exchange between a Data Producer and a Data Consumer.

As shown by 702, Dataset Consumer's Context Service 730 may send a dataset subscription request to a Registration Service 710.

As shown by 701, a Dataset Provider's Context Service 720 may send a dataset registration request to a Registration Service 710.

As shown by 703, upon encountering matching registration and subscription requests a registration Service 710 may send information about the matching subscription to a Dataset Provider's Context Service 720.

As shown by 704, upon encountering matching registration and subscription requests a registration Service 710 may send information about the matching registration to a Dataset Consumer's Context Service 730.

The order illustrated in FIG. 7 is merely exemplary. While the process of FIG. 7 illustrates certain steps performed in a particular order, it should be understood that the embodiments of the present invention may be practiced by adding one or more steps to the processes, omitting steps within the processes and/or altering the order in which one or more steps are performed.

Figure 8A:
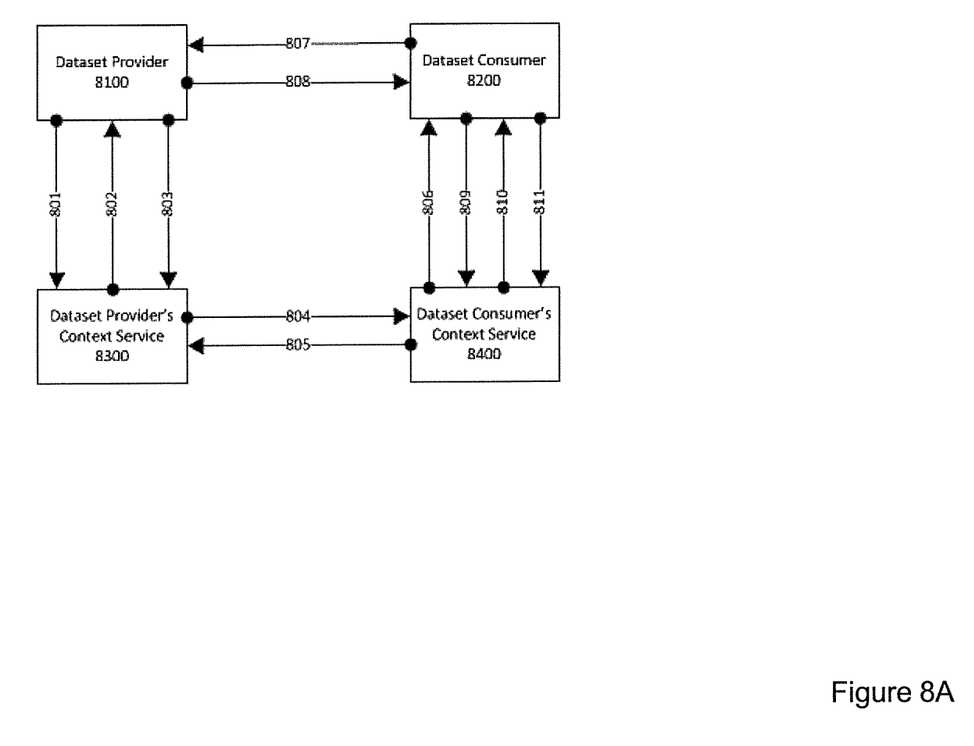
FIGS. 8A and 8B are an exemplary illustration of federated context collaboration model architecture at a run time, according to an embodiment of the present invention.
Figure 8B:
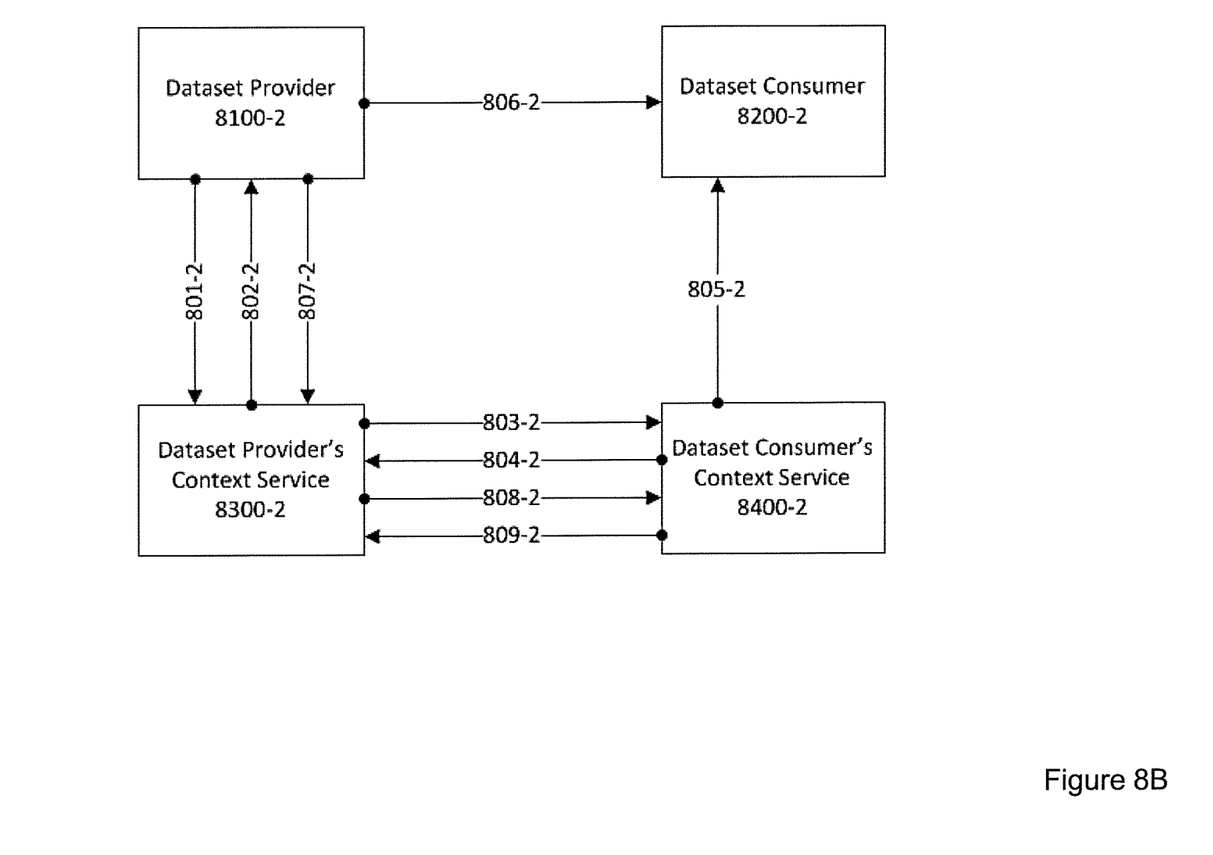

FIGS. 8A and 8B are an exemplary illustration of federated context collaboration model architecture at a run time, according to an embodiment of the present invention. FIG. 8A is an exemplary protocol for implementing run time federated context collaboration model architecture for bounded datasets, according to an embodiment of the present invention.

As shown by 801, Dataset Provider 8100 may request new context for a new dataset.

As shown by 802, Dataset Provider's Context Service 8300 may create a new context in a started/open state and return its handle to the Dataset Provider 8100.

As shown by 803, Dataset Provider 8100 may communicate to Dataset Provider's Context Service 8300 event of completion of the dataset creation and completes the respective context.

As shown by 804, Dataset Provider's Context Service 8300 may send the context to a Dataset Consumer's Context Service 8400 for each consumer that subscribed for the dataset or may subscribe for the dataset in the future. The point-to-point communication is for illustration purpose only; the communication may be realized by any of the existing or invented in the future communication mechanisms that include but not limited to message exchange, publish/subscribe, log propagation, remote method invocation, remote state transfer, and others over any applicable network protocol.

As shown by 805, a Dataset Consumer's Context Service 8400 upon receiving context reference from a Dataset Provider's Context Service 8300 may create a context in its own store, may capture dependency on the context sent by the Dataset Provider's Context Service 8300, and may notify the Dataset Provider's Context Service 8300 about this context. Dataset Provider's Context Service 8300 then may capture association of context completed by activity 803 and context received via activity 805.

As shown by 806, Dataset Consumer's Context Service 8400 may communicate the context created to its associated Dataset Consumer 8200.

As shown by 807, Dataset Consumer 8200 may request data in the dataset created by referencing contexts created and, by de-linking, the context received.

As shown by 808, the Dataset Provider 8100 may send to the Dataset Consumer 8200 data from the requested dataset.

Dataset Consumer 8200 may save this data in its own store and then use it, or it may use the data without storing it first.

As shown by 809, the Dataset Consumer 8200 may request new context in started/open state from the Dataset Consumer's Context Service 8400 for the results of the processing of data received from the Dataset Provider 8100.

As shown by 810, Dataset Consumer's Context Service 8400 may create the requested context, capture its dependency on the context created, and communicate it to the Dataset Consumer 8200.

As shown by 811, upon finishing processing of data from the dataset created, the Dataset Consumer 8200 may request Dataset Consumer's Context Service 8400 to complete the context created.

FIG. 8B depicts an exemplary protocol for implementing run time federated context collaboration model architecture for streaming data, according to an embodiment of the present invention.

As shown by 801-2, Dataset Provider 8100-2 informs its Dataset Provider's Context Service 8300-2 that it is about to start streaming a dataset.

As shown by 802-2 the Dataset Provider's Context Service 8300-2 sets the state of the respective context to 'started/open'.

As shown by 803-2, the Dataset Provider's Context Service 8300-2 informs Dataset Consumer's Context Service 8400-2 that the dataset is 'started/open'.

As shown by 804-2, the Dataset Consumer Context Service 8400-2 may send the acknowledgement back to the Dataset Provider's Context Service 8300-2.

As shown by 805-2, the Dataset Consumer Context Service 8400-2 informs Dataset Consumer 8200-2 that data is on its way.

As shown by 806-2, Dataset Provider 8100-2 streams the data and Dataset Consumer 8200-2 receives it.

As shown by 807-2, when the dataset streaming is done for the day the Dataset Provider 8100-2 informs its Dataset Provider's Context Service 8300-2.

As shown by 808-2, Dataset Provider's Context Service 8300-2 marks the respective context on the producer' side to completed state and informs the Dataset Consumer's Context Service 8400-2

Figure 9:
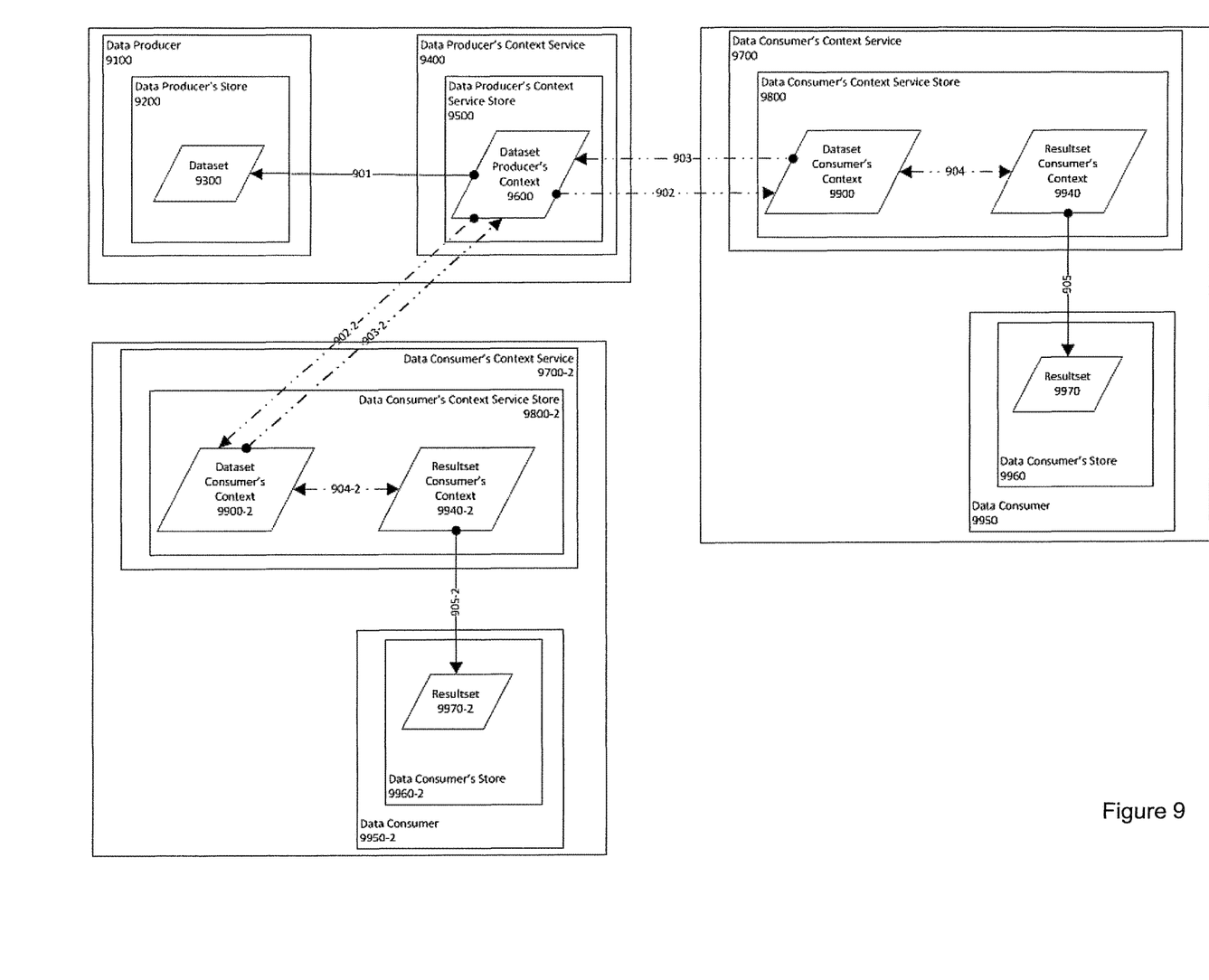
FIG. 9 is an exemplary illustration of the state of data and context and their dependencies at a run time, according to an embodiment of the present invention.

As shown by 809-2, Dataset Consumer's Context Service 8400-2 marks the respective context on the consumer side as completed and informs Dataset Provider's Context Service 8300-2 of the newly created context for completing of the bidirectional dependency chain as depicted in FIG. 9.

FIG. 9 depicts exemplary state of data in the architecture of the federated context collaboration model, according to an embodiment of the present invention upon completion of the dataset processing by its producer and consumers as described in steps 801 through 811.

Data Producer 9100 may have Data Store 9200 that may contain Dataset 9300. Data Producer's Context Service 9400 may have Context Store 9500 that may have Context 9600. As shown by 901, Context 9600 may have reference to Dataset 9300.

As shown by 902, Context 9600 may have reference to Context 9900 that may be located in Data Consumer's Context Store 9800 whish may be a part of Data Consumer's Context Service 9700. As shown by 903, Context 9900 may have reference back to Context 9600.

Links 902 and 903 ensure bidirectional reference across potentially different systems implemented on potentially different technology stacks.

As shown by 904, Context 9900 and Context 9940 may cross-reference each other.

As shown by 905, Context 9940 may reference result Dataset 9970 that may be located in Data Consumer's Store 9960 which may be part of Data Consumer 9950.

FIG. 9 shows two Consumers as an example of state when two consumers subscribe for the same dataset, according to an embodiment of the present invention. This is exemplary only and there may be any number of consumers for each of published datasets. Technology stack underlying implementations of Data Producer 9100, Data Producer's Context Service 9400, Data Consumer's Context Services 9700 and 9700-2, and Data Consumers 9950 and 9950-2 may be different from each other.

The embodiments of the present invention may support various participants and users. Participants may include data producers, in the role of publisher and subscribers, for example. Participants may also include data consumers, in the role of subscriber and publisher. Participants may further include a service, such as a context repository service, in the role of registrar, directory service and subscriber. Other participants and roles may be implemented.

According to an exemplary embodiment, a Data Producer may function in the role of a Publisher. A Publisher may publish context instance notification instances. Context events may include events that create or change the state of a context instance. Context state values may include, for example, started, completed, suspended, invalidated, retired, purged and superseded. A Context instance message may include required metadata attributes specified in its registration and any optional attributes that apply and may further include keys of contexts used to produce the data set.

Publishers may register new contexts with the Registration Service. For example, registrations may conform to a Context Business Object Model specification that will identify required and optional metadata attributes to be included in each instance message. Examples of context metadata attributes may include Registered name; Participant ID (e.g., unique ID assigned to the data provider); Local key (e.g., generated by local number font); Address of interface where data is available (e.g., URL for the façade or API for retrieving the data); Context name (e.g., descriptive name); Service name (e.g., service providing the data); Context type (e.g., types include: simple, composite, adjusted, . . . ); COB date; Event date-time stamp; Context state (e.g., as a result of an event that is published); and Consumed contexts (e.g., context dependency tree for context produced). Publishers can also update context registrations (e.g., modify, suspend, and retire).

According to an exemplary embodiment, a Data Consumer may function in the role of a Subscriber. A Subscriber may interrogate Context Collaboration Service, such as availability of contexts; and address of façade or API for data. Subscribers may also consume published context instances.

Other participant roles may include Data Consumer. According to an exemplary embodiment, a Data Consumer may function in the role of a Subscriber. A Subscriber may interrogate Context Collaboration Service for registered contexts; and receive instance messages for subscribed contexts.

According to an exemplary embodiment, a Data Consumer may function in the role of a Publisher. A Publisher may be an optional role where users publish instance messages for registered contexts; register Composite Contexts representing data consumption requirements and publish composite context instance messages.

An exemplary Registration Message Schema may include a Name (e.g., human understandable and unique); Registrant (e.g., data producer or data consumer registering the context); Information about the registration (e.g., version, status and date); Data Source (e.g., where to get the data and what method(s) to consume it); Context Type (e.g., what type of data set is referenced and ow frequently will a new instance be available); Context Dependency (e.g., what contexts are used in producing this data set) and Context Attributes (e.g., optional set of attributes if required, such as region, etc.).

A Context Instance Message may notify subscribers that the state of a context has changed. An exemplary Context Instance Message Schema may include context states; and context message content. Context states may include: Started, Completed, Invalid, Suspended, and Superseded. Other context states may be implemented. Context Message content may include source system posting the message; unique ID and date-time of the message; registered context name (e.g., by reference to registration provides source details and access methods); name generated for the instance; context state; contexts used; list of data object unique keys; and URI identifying location and access method of referenced data. Context Instance Message Scheme may also include a simple context message referencing the state of a single set (e.g., responsibility—data producer) and composite context message referencing the state of two or more sets (e.g., responsibility—multiple data producers).

Various embodiments of the present invention may be applied to collaboration use cases. Exemplary use cases may include Register Context; Subscribe to Context; Modify Context Registration; Publish Context Message and Consume Context.

For Register Context, context registration may identify and record a standard set of context metadata attributes defining context purpose, producing system, data location, access method and SLA for data production.

For Subscribe to Context, context subscriptions, taken by data consuming systems, may provide purpose driven routing and filtering of context messages, e.g., "Only send messages that I've subscribed for."

For Modify Context Registration, registration modifications may be required over the life cycle to address changing metadata requirements that reflect system changes. For example, these are expected to be infrequent events in a well-designed system.

For Publish Context Message, contexts events may demark context state changes. For example, a context instance message, announcing each change, may be published providing an alert to each consumer and an audit trail of each event in the context life cycle.

For Consume Context, context consumption may connote a retrieval and use of the set of data objects referenced by the context key.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

Further, various technologies may be used to provide communication between the various processors and/or memories, as well as to allow the processors and/or the memories of the invention to communicate with any other entity; e.g., so as to obtain further instructions or to access and use remote memory stores, for example.

As described above, a set of instructions is used in the processing of the invention. The set of instructions may be in the form of a program or software Further, it is appreciated that the instructions or set of instructions used in the implementation and operation of the invention may be in a suitable form such that the processing machine may read the instructions.

Any suitable programming language may be used in accordance with the various embodiments of the invention.

Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system.

In the system and method of the invention, a variety of "user interfaces" may be utilized to allow a user to interface with the processing machine or machines that are used to implement the invention.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A federated context collaboration architecture system that provides a consistent flexible and technology independent mechanism for referencing data, managing state of data, implementing compensating transaction functionality independent of underlying participants' transaction mechanism and not requiring a transaction coordinator, and providing design- and run-time data provenance and lineage; the federated context collaboration architecture comprising:
   a database acting as a context store that stores contexts consumed and produced by participants, where a context represents a description of a dataset; each context comprises a context key; a context state, a context class, data tags, methods of data-de-referencing, and data control metrics; and captured context dependencies;
   a context producer interface programmed to: define and reference data sets, data exchange, and data dependencies associated with each context; and
   a computer processor, coupled to the database and the context producer interface, programmed to:
      implement a context engine coupled to the context store and the context producer interface to (1) request a context status change from the context store, (2) receive confirmation of the status change from the context store, (3) communicate at least the state of data, data lineage and dependencies of data used to integrate and coordinate processes across different domains and infrastructures, (4) implement registrations for application aligned context servers to advertise and subscribe to contexts of interest, (5) request and receive information about existing registrations, and (6) exchange contexts across registered context servers; and
      facilitate a communication interface that communicates a defined metadata profile of each context, the interface coupled to a communication network; and
   wherein the context state represents a position within a context lifecycle and includes "started," where the context may be created, "open," where the context may be modified, "completed," if the context is successfully created through the started and open states, "error," if the context is not successfully created through the started and open states, and "superseded," if a new context is available but the context is still historically correct.

2. The system of claim 1, wherein the participants comprise: data producers and data consumers.

3. The system of claim 1, wherein the context key represents an identifier of one or more data objects that make up a dataset.

4. The system of claim 1, wherein the context class comprises one of but not limited to: simple, composite, manifest, recipe, filtered and adjusted.

5. The system of claim 1, wherein the communication interface enables a participant to collect, persist and make available a defined metadata profile of each published context.

6. The system of claim 1, wherein the context engine captures an auditable history of context use and production that provides run-time provenance and data lineage.

7. The system of claim 1, wherein the context engine captures context events and event dependencies and persists them in a database, a Triple or Quad Store or other Storage Implementation.

8. The system of claim 1, wherein the context engine implements and executes an algorithm to provide context provenance and lineage.

9. The system of claim 1, wherein the captured context provenance and lineage are used for optimized selective priming of testing environments with the data necessary and sufficient for the conducting of the testing process.

10. An automated computer implemented method for implementing federated context collaboration architecture, wherein the method comprising the steps of:
   storing, in a context database, contexts consumed and produced by participants, where a context represents a description of a dataset that provides a consistent flexible and technology independent mechanism for referencing or managing data; each context comprises a context key; a context state and a context class;
   defining, via a context producer interface, datasets, data exchange, and data dependencies associated with each context;
   implementing via a programed computer processor, a context engine coupled to the context database and the context producer interface configured to (1) request a context status change from the context store, (2) receive confirmation of the status change from the context store, (3) process and communicate at least the state of data, data lineage and dependencies of data used to integrate and coordinate processes across different domains and infrastructures (4) implement registrations for application aligned context servers to advertise and subscribe to contexts of interest, (5) request and receive information about existing registrations, and (6) exchange contexts across registered context servers; and
   transmitting, via a communication interface a defined metadata profile of each context, the interface coupled to a communication network; and
   wherein the context state represents a position within a context lifecycle and includes "started," where the context may be created, "open," where the context may be modified, "completed," if the context is successfully created through the started and open states, "error," if the context is not successfully created through the started and open states, and "superseded," if a new context is available but the context is still historically correct.

11. The method of claim 10, wherein the participants comprise: data producers and data consumers.

12. The method of claim 10, wherein the context key represents an identifier of one or more data objects that make up a dataset.

13. The method of claim 10, wherein the context class comprises one of: simple, composite, manifest, recipe, filtered and adjusted or other to be defined state.

14. The method of claim 10, wherein the communication interface enables a participant to collect, persist and make available a defined metadata profile of each published context.

15. The method of claim 10, wherein the context engine captures an auditable history of context use and production that provides run-time provenance and data lineage.

16. The method of claim 10, wherein the context engine captures context events and event dependencies and persist them in a graph database, a triple or quad store or other to be selected storage implementation.

17. The method of claim 10, wherein the context engine implements and executes an algorithm to provide context provenance and lineage.

* * * * *